(12) United States Patent
Nagamine et al.

(10) Patent No.: US 12,076,806 B2
(45) Date of Patent: Sep. 3, 2024

(54) SEALING METHOD FOR LIQUID INLET PORT OF POWER STORAGE DEVICE

(71) Applicant: NAG System Co., Ltd., Osaka (JP)

(72) Inventors: Hidemasa Nagamine, Osaka (JP); Keiji Wada, Osaka (JP); Takahiro Asada, Osaka (JP)

(73) Assignee: NAG SYSTEM CO., LTD., Osaka (JP)

( * ) Notice: Subject to any disclaimer, the term of this patent is extended or adjusted under 35 U.S.C. 154(b) by 447 days.

(21) Appl. No.: 17/396,293

(22) Filed: Aug. 6, 2021

(65) Prior Publication Data

US 2022/0055143 A1 Feb. 24, 2022

(30) Foreign Application Priority Data

Aug. 19, 2020 (JP) ................. 2020-138936

(51) Int. Cl.
| | | |
|---|---|---|
| *B23K 11/11* | (2006.01) | |
| *B23K 11/00* | (2006.01) | |
| *B23K 11/25* | (2006.01) | |
| *B23K 11/26* | (2006.01) | |
| *B23K 101/36* | (2006.01) | |

(Continued)

(52) U.S. Cl.
CPC ......... *B23K 11/115* (2013.01); *B23K 11/0026* (2013.01); *B23K 11/258* (2013.01); *B23K 11/26* (2013.01); *H01M 50/184* (2021.01); *H01M 50/636* (2021.01); *B23K 2101/36* (2018.08)

(58) Field of Classification Search
CPC ... B23K 11/0026; B23K 11/11; B23K 11/115; B23K 11/14; B23K 11/258; B23K 11/26; B23K 2101/36; H01M 10/425; H01M 10/441; H01M 10/482; H01M 2010/4271; H01M 50/184; H01M 50/636; Y02E 60/10

USPC ..................................................... 219/91.2
See application file for complete search history.

(56) References Cited

U.S. PATENT DOCUMENTS

| | | |
|---|---|---|
| 8,981,788 B2 | 3/2015 | Ishida et al. |
| 2015/0042348 A1 | 2/2015 | Ishida et al. |

FOREIGN PATENT DOCUMENTS

| | | | |
|---|---|---|---|
| CN | 110773855 | * | 2/2020 |
| CN | 110773855 A | | 2/2020 |
| JP | 59-218284 A | | 12/1984 |

(Continued)

OTHER PUBLICATIONS

European Extended Search Report for EP Application No. 21191999. 8, entitled "Sealing Method for Liquid Inlet Port of Power Storage Device," mailed on Jan. 11, 2022.

*Primary Examiner* — Dana Ross
*Assistant Examiner* — Joseph W Iskra
(74) *Attorney, Agent, or Firm* — Hamilton, Brook, Smith & Reynolds, P.C.

(57) ABSTRACT

A sealing method that uses an electrostatic energy storage welding machine which includes an energy storage section including a plurality of energy storage parts is provided. A method of sealing a liquid inlet port of a power storage device includes burring in advance a through-hole of the liquid sealing port to raise a hole edge of the through-hole into a form of a projection, wherein the liquid sealing port of the power storage device to be sealed with electrolyte contained therein corresponds to an object to be welded; placing a spherical body that is a lid body on the projection; and performing resistance welding between the projection and the spherical body to seal the liquid inlet port.

3 Claims, 6 Drawing Sheets

(51) Int. Cl.
*H01M 50/184*    (2021.01)
*H01M 50/636*    (2021.01)

(56) References Cited

FOREIGN PATENT DOCUMENTS

| | | | |
|---|---|---|---|
| JP | 11-135082 | A | 5/1999 |
| JP | H11135082 | * | 5/1999 |
| JP | 2001-057207 | A | 2/2001 |
| JP | 2002-239762 | A | 8/2002 |
| JP | 2009-213242 | A | 9/2009 |
| JP | 2013-171801 | A | 9/2013 |
| JP | 2015-035853 | A | 2/2015 |

* cited by examiner

PRIOR ART

US 12,076,806 B2

SEALING METHOD FOR LIQUID INLET PORT OF POWER STORAGE DEVICE

CROSS REFERENCE TO THE RELATED APPLICATION

This application is based on and claims Convention priority to Japanese patent application No. 2020-138936, filed Aug. 19, 2020, the entire disclosure of which is herein incorporated by reference as a part of this application.

BACKGROUND OF THE INVENTION

Field of the Invention

The present invention relates to a method of sealing a liquid inlet port for electrolyte of a power storage device (such as a secondary battery and an electrolytic capacitor) using an electrostatic energy storage welding machine.

Description of Related Art

A conventionally known method of sealing a power storage device 30 such as a lithium-ion battery (secondary battery), as shown in FIG. 7A, includes: accommodating, in a container 31, non-illustrated positive and negative electrodes and a separator interposed between and wound around the positive and negative electrodes; pouring electrolyte into the container 31 from a liquid inlet port 35 formed in the container 31; and then sealing the liquid inlet port 35. A power storage device such as an electrolytic capacitor is also constructed such that after electrolyte is poured into a container from a liquid inlet port, the liquid inlet port is sealed.

The container 31 has e.g. a polygonal cylindrical shape, and the container has an upper face constituted by a sealing plate 32 having a flat plate-like shape and provided with a positive electrode terminal 33 and a negative electrode terminal 34 as well as a liquid inlet port 35 opened between the positive electrode terminal 33 and the negative electrode terminal 34. As shown in FIG. 7B, the liquid inlet port 35 is closed by a lid body 36 and is then seal-welded.

In this case, for example, it is known that the liquid inlet port of the secondary battery may be seal-welded by a laser (for example, Patent Document 1).

RELATED DOCUMENT

Patent Document

[Patent Document 1] JP Laid-open Patent Publication No. 2013-171801

SUMMARY OF THE INVENTION

Seal-welding by a laser, however, may cause the electrolyte 37 contained in the sealed container 31 below a welded site 38 (FIG. 9) to be heated due to heat during welding as shown in FIG. 8, which may result in functional deterioration such as deformation of the accommodated separator. Further, as shown in FIG. 9, the lid body 36 is welded over its entire circumference to close a hole of the liquid inlet port 35. In this regard, the presence of a pinhole(s) in the welded site 38 may make the product defective.

An object of the present invention is to solve the above problem and provide a method of sealing a liquid inlet port of a power storage device by resistance welding using an electrostatic energy storage welding machine adapted to store large power, so that welding is stably performed to suppress heat influence and thereby reduce the number of defective products.

A method of sealing a liquid inlet port of a power storage device using an electrostatic energy storage welding machine according to the present invention includes:
  by using the electrostatic energy storage welding machine including an energy storage section including a plurality of energy storage parts, the electrostatic energy storage welding machine being configured to individually charge and discharge the plurality of energy storage parts to stabilize voltages of the energy storage parts having variation in performance and to perform resistance welding of an object to be welded by applying power produced by a stabilized set voltage and an electric current while applying pressure to the object to be welded between welding electrodes,
  burring in advance a through-hole of a liquid sealing port of the power storage device to raise a hole edge of the through-hole into a form of a projection, wherein the liquid sealing port of the power storage device through which an electrolyte is introduced into the power storage device is the object to be welded;
  placing a spherical body that is a lid body on the projection; and
  performing resistance welding between the projection and the spherical body to seal the liquid inlet port.

According to this constitution, the electrostatic energy storage welding machine configured to store large power is used to apply large power produced by a large electric current and a stabilized set voltage, even where there is variation in performance among the large-capacity energy storage parts, to perform resistance welding between the burring projection formed in advance at the liquid sealing port of the power storage device and the spherical body as a lid body. Thus, the electric current is concentrated to the projection, so that welding is stabilized. Therefore, it is possible to perform resistance welding with the large electric current for a short period of time so as to suppress heat influence and reduce the number of defective products.

In one embodiment of the present invention, the electrostatic energy storage welding machine may include:
  an individual charge circuit configured to individually charge the plurality of energy storage parts;
  an individual discharge circuit configured to individually discharge the respective energy storage parts;
  a voltage monitor circuit configured to individually monitor the voltages of the respective energy storage parts;
  an individual voltage stabilization control section configured to perform control to further charge an energy storage part having a deviation in performance in an individual manner to stabilize a voltage of that energy storage part and thereby achieve a set voltage; and
  an output circuit configured to output power produced by the set voltage stabilized through individual charging and an electric current through individual discharging in the energy storage section to apply the electric current between the welding electrodes.

According to this constitution, the electrostatic energy storage welding machine individually monitors the voltages of the respective energy storage parts, and charges and discharges the respective energy storage parts in a divided manner through individual charging and individual discharging. This makes it easy to match the voltage to the set voltage, so that the set voltage has a smaller error. At the same time, this also improves efficiency and makes it possible to shorten the time required for charging and discharging. Moreover, the energy storage part(s) having a deviation is further charged in an individual manner to stabilize the voltage of each energy storage part, so that the variation among the energy storage parts can be efficiently accommodated. Further, the individual discharging makes it possible to discharge the stored large power at high speed, so that production efficiency can be improved. Thus, it is possible to accommodate variation in performance among a plurality of energy storage parts and to efficiently output large power produced by a set voltage and a large electric current during welding so as to speed up resistance welding and improve the production efficiency.

In the present invention, the power storage device may be a secondary battery or an electrolytic capacitor. In this case, the effect of suppressing heat influence on the electrolyte is further enhanced.

In the present invention, the resistance welding may be performed in a ring shape between a peripheral tip end of the projection and a peripheral surface of the spherical body in contact with the peripheral tip end. In this case, welding can be further stabilized.

The present invention encompasses any combination of at least two features disclosed in the claims and/or the specification and/or the drawings. In particular, any combination of two or more of the appended claims should be equally construed as included within the scope of the present invention.

BRIEF DESCRIPTION OF THE DRAWINGS

The present invention will be more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like or corresponding parts throughout the several views. In the figures.

DESCRIPTION OF THE EMBODIMENTS

Figure 1:
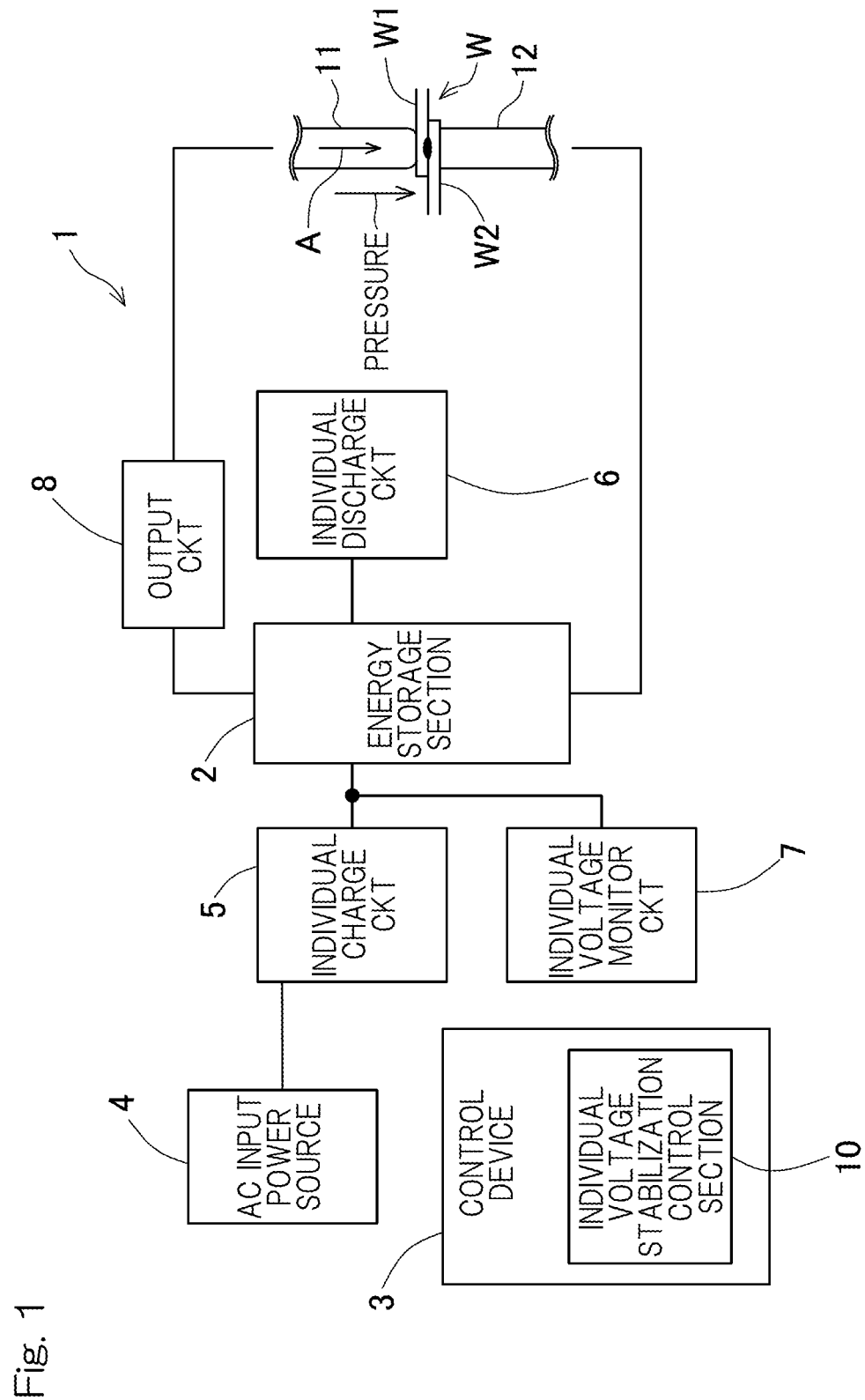
FIG. 1 is a schematic diagram showing an electrostatic energy storage welding machine used in a method of sealing a liquid inlet port of a power storage device according to an embodiment of the present invention.

Hereinafter, an embodiment of the present invention will be described with reference to the drawings. FIG. 1 is a schematic diagram showing an electrostatic energy storage welding machine (hereinafter, simply referred to as "welding machine") 1 used in a method of sealing a liquid inlet port of a power storage device according to an embodiment of the present invention. The welding machine 1 includes an energy storage section 2 including a plurality of large-capacity energy storage parts C and is configured to perform resistance welding of an object W to be welded by supplying large power while applying pressure to the object W to be welded between welding electrodes. This welding machine is suitable in a case where there is variation in performance among the respective energy storage parts C and in a case of resistance welding which requires, e.g., conduction of a large electric current for a short period of time and speeding up of the production processes.

The welding machine 1 includes an input power source 4 (e.g. an AC 200V model), an individual charge circuit 5 for individually charging the plurality of energy storage parts C, an individual discharge circuit 6 for individually discharging the respective energy storage parts C, an individual voltage monitor circuit 7 for individually monitoring voltages of the respective energy storage parts C, an output circuit 8, and a control device 3. The control device 3 controls the entire welding machine 1, and besides, sets a voltage value and an electric current value of the large power necessary for resistance welding in accordance with the type of the object W to be welded and controls pressurization between welding electrodes 11, 12.

The control device 3 includes an individual voltage stabilization control section 10. The individual voltage stabilization control section 10 performs control to further charge an energy storage part having a deviation in an individual manner to stabilize the voltage of that energy storage part and thereby achieve a set voltage. The output circuit 8 outputs large power produced by the set voltage stabilized through individual charging and the large electric current through individual discharging in the energy storage section 2 to supply the power between the welding electrodes 11, 12.

Figure 2:
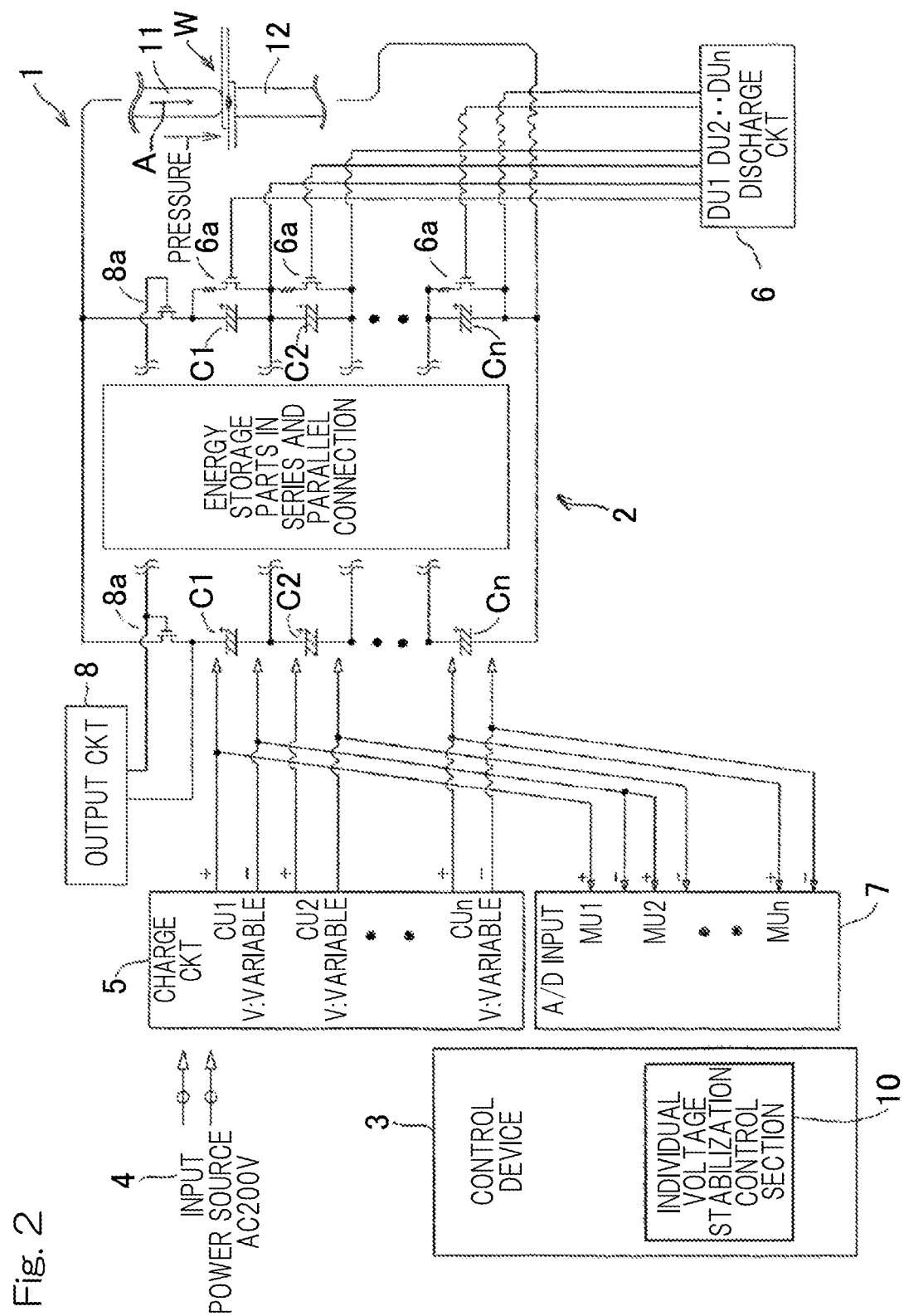
FIG. 2 is a circuit diagram specifically showing a part of FIG. 1.

FIG. 2 is a circuit diagram specifically showing a part of FIG. 1. The energy storage parts C may be e.g. electric double-layer capacitors. The plurality of energy storage parts C are connected in series and parallel to constitute the energy storage section 2.

The individual charge circuit 5 for charging the energy storage section 2 includes a first unit CU1 to an n-th unit CUn for the respective energy storage parts C. The individual discharge circuit 6 for discharging the energy storage section 2 also includes a first unit DU1 to an n-th unit DUn for the respective energy storage parts C. The individual charge circuit 5 can set the voltages of the respective energy storage parts C in a variable manner in a range from e.g. 0 to 2.5 V. The individual discharge circuit 6 includes discharge units 6a for the respective energy storage parts C, each of the discharge units having a switch such as a field effect transistor (FET). A first unit MU1 to an n-th unit MUn of an analog/digital (A/D) input type, which are included in the individual voltage monitor circuit 7, are connected between the first unit CU1 to the n-th unit CUn of the individual charge circuit 5 and the respective energy storage parts C. The output circuit 8 includes output units 8a each having a switch such as an FET and outputs large power in response to a non-illustrated output signal from the control device 3.

Figure 3:
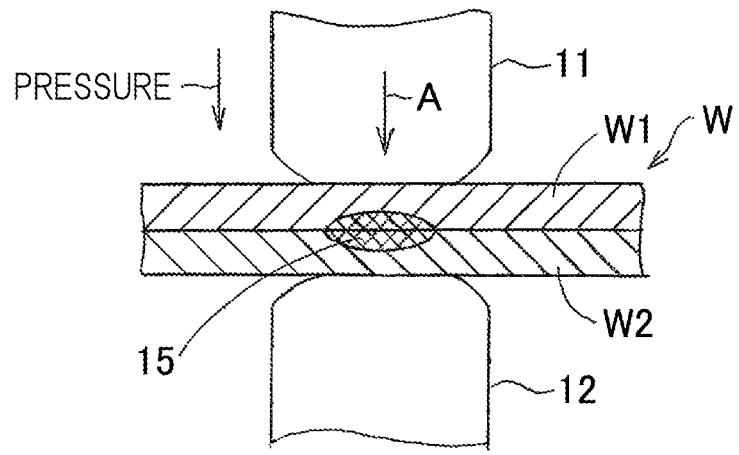
FIG. 3 illustrates an operation of resistance welding.

When the welding electrodes 11, 12 are brought into contact with metal materials W1, W2 of the object W to be welded and conducts an electric current while applying pressure to the object to be welded, the welding current A flows from the upper welding electrode 11 to the lower welding electrode 12 through the metal materials W1, W2. As a result of the electric current application, nugget (alloy layer) 15 is formed between the metal materials W1, W2 due to resistance heating as shown in FIG. 3, so that the metal materials are resistance-welded by melt-bonding.

In the resistance welding, thanks to use of a large-capacity power system including the large-capacity energy storage section 2, only a small voltage drop occurs during a short electric current application period, so that the set voltage and the large electric current can be maintained during the electric current application period. Since resistance welding is performed with a large electric current for a short period of time through melt-bonding by formation of the nugget (alloy layer) 15, with the set voltage and the large electric current in accordance with the object W to be welded being maintained, it is possible to efficiently weld the materials and to suppress influence due to heat on the object W to be welded.

The welding machine 1 individually monitors, on every occasion of resistance welding, the voltages of the respective energy storage parts C by the individual voltage monitor circuit 7, and charges and discharges the respective energy storage parts C in a divided manner through individual charging by the individual charge circuit 5 and individual discharging by the individual discharge circuit 6. This makes it easy to match the voltage to the set voltage, so that the set voltage has a smaller error. In addition, this also improves efficiency and makes it possible to shorten the time required for charging and discharging.

Further, the individual voltage stabilization control section 10 monitors the voltages of the respective energy storage parts C which are individually charged by the individual voltage monitor circuit 7 and further charges, among the energy storage parts C, an energy storage part(s) C having an insufficient charging voltage due to its deviation in performance in an individual manner to eliminate the insufficiency in order to stabilize the voltage of that energy storage part and thereby achieve the set voltage.

Figure 4:
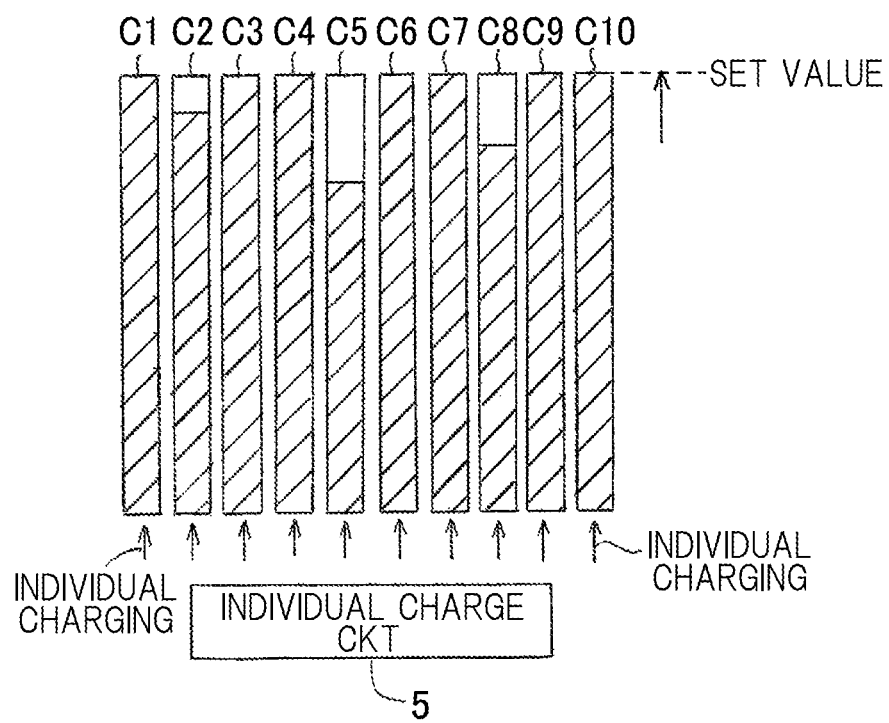
FIG. 4 schematically illustrates an operation of individual voltage stabilization.

As shown in the schematic diagram of FIG. 4, for example, in a case where three energy storage parts C2, C5, C8 out of ten energy storage parts C1 to C10 exhibit deviations in performance, the other seven energy storage parts C1, C3 to C4, C6 to C7, C9 to C10 without such a deviation complete charging when their voltages reach the set value, and only the energy storage parts C2, C5, C8 having insufficient voltages due to the deviations are continuously charged in a concentrated manner in a short period of time. Thus, even where the energy storage parts have variation, the voltages can reach the set voltage and be stabilized in a short charging time, so that the variation can be eliminated. Therefore, the production efficiency can further be improved.

The individual discharge circuit 6 can individually discharge the respective energy storage parts C of the energy storage section 2 so as to prevent inflow of an electric current between the energy storage parts C to retain a large electric current, and to discharge the stored large power at high speed to remarkably shorten the discharging time. Thus, the production efficiency can further be improved. In addition, the time for discharging can remarkably be shortened, as compared to the case where the entire energy storage section is discharged in a conventional manner.

In this way, for every object W to be welded, the welding machine 1 individually monitors the voltages of the respective energy storage parts C by the individual voltage monitor circuit 7, charges and discharges the respective energy storage parts C in a divided manner through individual charging by the individual charge circuit 5 and individual discharging by the individual charge circuit 6, and further charges an energy storage part(s) C having a deviation in performance in an individual manner by the individual voltage stabilization control section 10 to stabilize the voltages. Thus, thanks to the combination of the operations of the respective circuits, it is possible to accommodate variation among a plurality of energy storage parts and efficiently output large power produced by a set voltage and a large electric current during welding. As a result, it is possible to speed up the production processes of resistance welding and improve the production efficiency. This makes it possible to promptly make adjustment to meet various welding conditions depending on the object W to be welded, so that the time required for different operations can be shortened, and the welding machine can be applied to high-mix low-volume production in which production occurs with frequent changes of different types of objects W to be welded.

Figure 5:
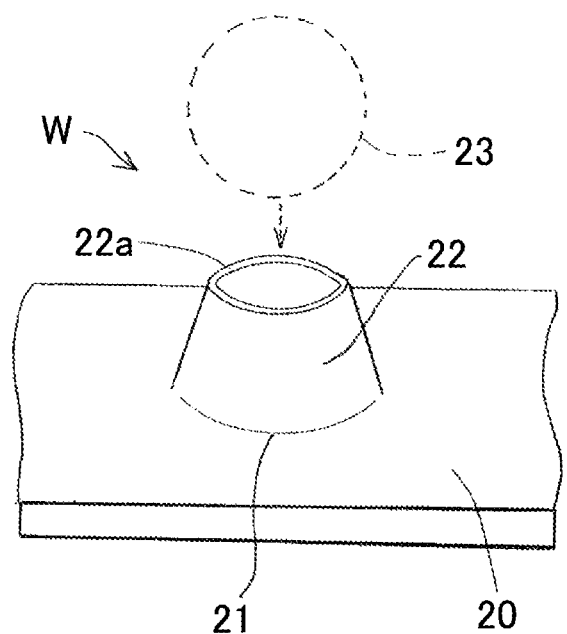
FIG. 5 is a schematic perspective view showing a method of sealing a liquid inlet port of a power storage device according to an embodiment of the present invention.

The following describes a method of sealing a liquid inlet port of a power storage device using the welding machine 1. FIG. 5 is a schematic perspective view showing a method of sealing a liquid inlet port of a power storage device according to an embodiment of the present invention. For example, a container of a power storage device such as a secondary battery has, on an upper face of the container, a sealing plate 20 made of e.g. aluminum or stainless steel and provided with a liquid sealing port 21, through which an electrolyte is introduced into the power storage device. The liquid sealing port 21 has a through-hole 21a which has been processed by burring in advance to raise a hole edge of the through-hole into a form of a burring projection 22 which is a protruding part. The burring may be carried out, for example, by pushing a punch into the through-hole 21a to raise the hole edge while enlarging the hole edge. The through-hole 21a of the liquid sealing port 21 serves as the liquid inlet port for pouring the electrolyte in an assembling procedure of the power storage device.

Resistance welding is performed between the projection 22 and a spherical body 23 (indicated by a dashed line) in FIG. 5 made of e.g. aluminum or stainless steel, which is a lid body placed on the projection 22, to seal the liquid sealing port 21. The projection 22 and the spherical body 23 at the liquid sealing port 21 correspond to the object W to be welded.

Figure 6A:
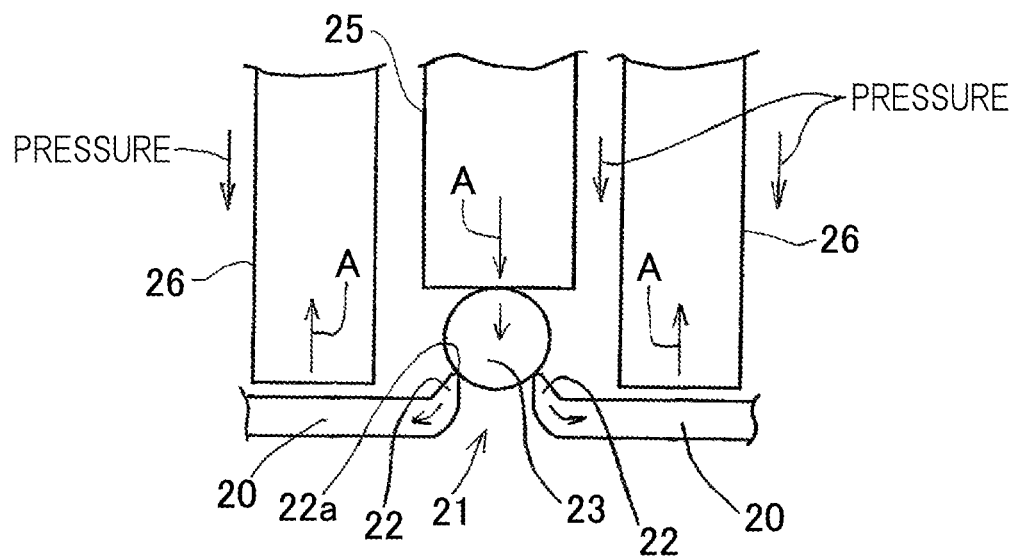
FIG. 6A is a side view showing the method of sealing the liquid inlet port of the power storage device of FIG. 5.

In this case, instead of applying an electric current between the upper and lower electrodes with the object W to be welded placed therebetween as described above, an electric current is applied between a primary welding electrode 25 in contact with the spherical body 23 above the sealing plate 20 and secondary welding electrodes (grounds) 26 disposed on both sides with respect to the primary welding electrode 25 and placed in contact with the upper face of the sealing plate 20 connected to the projection 22 in contact with the spherical body 23, as shown in FIG. 6A. The electric current flows from the primary welding electrode 25 to the secondary welding electrodes (grounds) 26 via the spherical body 22, the projection 23, and the sealing plate 20. Pressure is applied to the primary welding electrode 25 and the secondary welding electrodes 26 in a similar manner as above.

The electric current from the primary welding electrode 25 flows in a concentrated manner from the spherical body 23 to the projection 22 having a narrow peripheral tip end 22a in contact with the spherical body, so that it is possible to prevent heat dispersion so as to stabilize welding. Thus, resistance welding with a large electric current for a short period of time makes it possible to suppress heat influence on the electrolyte in the container as compared with conventional ultrasonic welding and thereby to prevent functional deterioration of a content in the container.

Figure 6B:
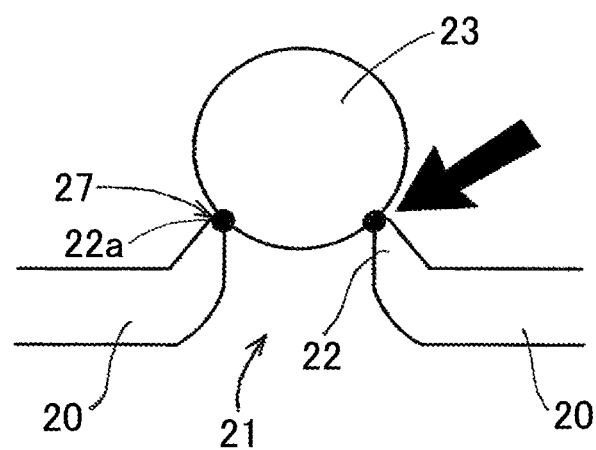
FIG. 6B is an enlarged partial view of FIG. 6A.
Figure 7A:
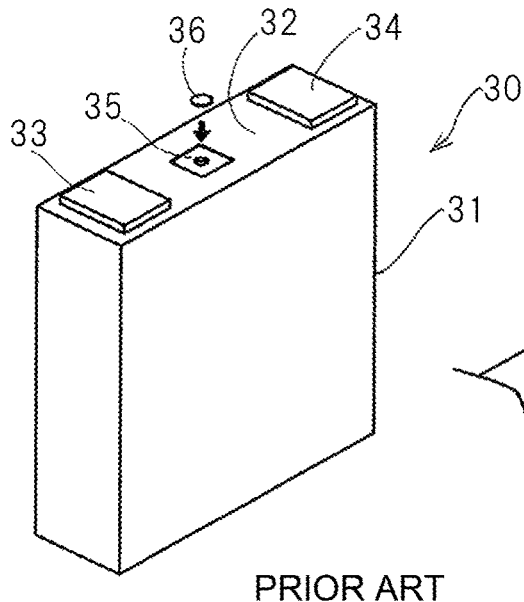
FIG. 7A is a perspective view showing a conventional method of sealing a liquid inlet port of a power storage device.
Figure 7B:
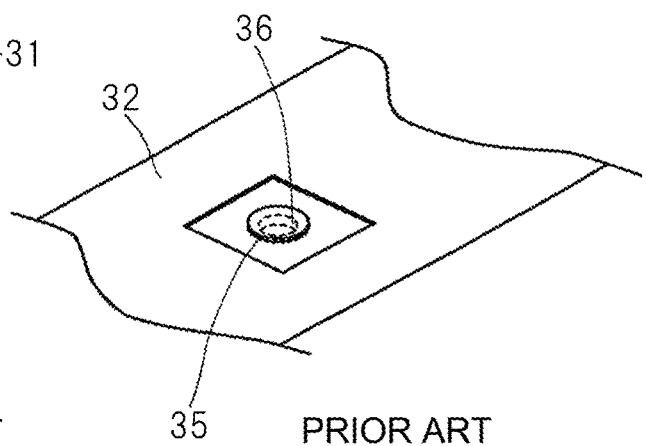
FIG. 7B is a perspective view showing a part of FIG. 7A in an enlarged manner.
Figure 8:
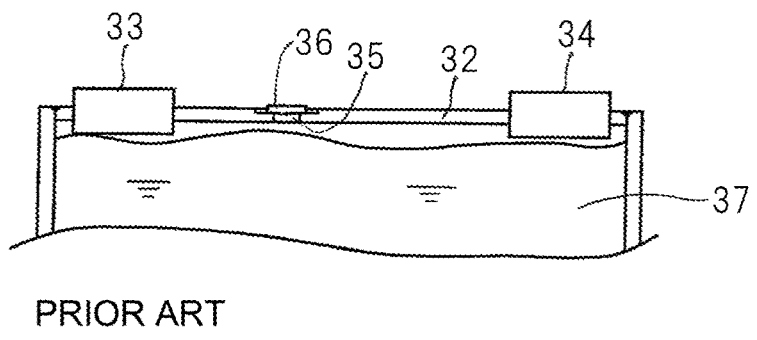
FIG. 8 is a side view of FIG. 7A.
Figure 9:
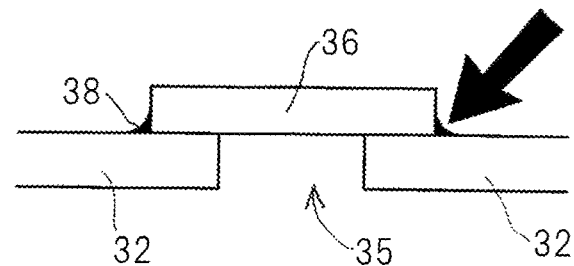
FIG. 9 is a side view showing a conventional method of sealing a liquid inlet port of a power storage device.

As shown in FIG. 6B, resistance welding is performed in a ring shape between the peripheral tip end 22a of the projection 22 and a peripheral surface of the spherical body 23 in contact with the peripheral tip end. Thus, nugget (alloy layer) 27 is formed between the spherical body 23 and the projection 22 due to resistance heating, so that the metal materials are resistance-welded by melt-bonding. In this case, pinholes are not generated unlike a conventional case, so that it is possible to reduce the number of defective products and to further stabilize welding.

As described above, in the present invention, the electrostatic energy storage welding machine configured to store large power is used to apply large power produced by a large electric current and a stabilized set voltage, even where there is variation in performance among the large-capacity energy storage parts, to perform resistance welding between the burring projection formed in advance at the liquid sealing port of the power storage device and the spherical body as a lid body. Thus, the electric current is concentrated to the projection, so that welding is stabilized. Therefore, it is possible to perform resistance welding with the large electric current for a short period of time so as to suppress heat influence and reduce the number of defective products.

The present invention can individually monitor the voltages of the respective energy storage parts, charge and discharge the respective energy storage parts in a divided manner through individual charging and individual discharging, and further charge an energy storage part(s) having a deviation in performance in an individual manner to stabilize the voltages. Thus, it is possible to accommodate variation in performance among a plurality of energy storage parts and to efficiently output large power produced by a set voltage and a large electric current during welding so as to speed up resistance welding and improve the production efficiency.

It should be noted that the present embodiment may also be applied to an electrolytic capacitor as a power storage device, instead of the secondary battery used herein.

The present invention will not be limited to the above embodiments, and various additions, modifications, or deletions may be made without departing from the scope of the invention. Accordingly, such variants are included within the scope of the present invention.

REFERENCE NUMERALS

1 . . . electrostatic energy storage welding machine
2 . . . energy storage section
3 . . . control device
4 . . . AC input power source
5 . . . individual charge circuit
6 . . . individual discharge circuit
7 . . . individual voltage monitor circuit
8 . . . output circuit
10 . . . individual voltage stabilization control section
11, 12 . . . welding electrode
15, 27 . . . nugget (alloy layer)
20 . . . sealing plate
21 . . . liquid sealing port
22 . . . projection
23 . . . spherical body
25 . . . primary welding electrode
26 . . . secondary welding electrode
C . . . large-capacity energy storage part
W . . . object to be welded

What is claimed is:

1. A method of sealing a liquid inlet port of a power storage device, the method comprising:
by using an electrostatic energy storage welding machine including an energy storage section including a plurality of energy storage parts, the electrostatic energy storage welding machine being configured to individually charge and discharge the plurality of energy storage parts to stabilize voltages of the energy storage parts having variation in performance and to perform resistance welding of an object to be welded by applying power produced by a stabilized set voltage and an electric current while applying pressure to the object to be welded between welding electrodes,
burring in advance a through-hole of a liquid sealing port of the power storage device to raise a hole edge of the through-hole into a form of a projection, wherein the liquid sealing port of the power storage device through which an electrolyte is introduced into the power storage device is the object to be welded;
placing a spherical body that is a lid body on the projection; and
performing resistance welding between the projection and the spherical body to seal the liquid inlet port, wherein the electrostatic energy storage welding machine includes:
an individual charge circuit configured to individually charge the plurality of energy storage parts;
an individual discharge circuit configured to individually discharge the respective energy storage parts;
a voltage monitor circuit configured to individually monitor the voltages of the respective energy storage parts;
an individual voltage stabilization control section configured to perform control to further charge an energy storage part having a deviation in performance in an individual manner to stabilize a voltage of that energy storage part and thereby achieve a set voltage; and
an output circuit configured to output power produced by the set voltage stabilized through individual charging and an electric current through individual discharging in the energy storage section to apply the electric current between the welding electrodes.

2. The method of sealing the liquid inlet port of the power storage device as claimed in claim 1, wherein the power storage device is a secondary battery or an electrolytic capacitor.

3. The method of sealing the liquid inlet port of the power storage device as claimed in claim 1, wherein the resistance welding is performed in a ring shape between a peripheral tip end of the projection and a peripheral surface of the spherical body in contact with the peripheral tip end.

* * * * *